United States Patent
Blair et al.

(10) Patent No.: US 7,843,486 B1
(45) Date of Patent: Nov. 30, 2010

(54) SELECTIVE MUTING FOR CONFERENCE CALL PARTICIPANTS

(75) Inventors: Colin Blair, Westleigh (AU); Kevin Chan, Ryde (AU); Andrew W. Lang, Epping (AU); Christopher Reon Gentle, Gladesville (AU); Neil Hepworth, Artarmon (AU)

(73) Assignee: Avaya Inc., Basking Ridge, NJ (US)

( * ) Notice: Subject to any disclaimer, the term of this patent is extended or adjusted under 35 U.S.C. 154(b) by 1269 days.

(21) Appl. No.: 11/402,120

(22) Filed: Apr. 10, 2006

(51) Int. Cl.
*H04N 7/14* (2006.01)
(52) U.S. Cl. .................................... 348/14.01; 381/310
(58) Field of Classification Search ................. 381/310, 381/381; 348/14.01–14.16
See application file for complete search history.

(56) References Cited

U.S. PATENT DOCUMENTS

| | | | |
|---|---|---|---|
| 5,335,011 A * | 8/1994 | Addeo et al. | 348/14.1 |
| 6,125,115 A | 9/2000 | Smits | |
| 6,453,022 B1 | 9/2002 | Weinman | |
| 6,674,842 B2 | 1/2004 | Weinman | |
| 6,912,178 B2 * | 6/2005 | Chu et al. | 348/E7.079 |
| 7,065,222 B2 * | 6/2006 | Wilcock | 381/310 |
| 7,245,710 B1 * | 7/2007 | Hughes | 379/202.01 |
| 2003/0081115 A1 | 5/2003 | Curry et al. | |
| 2005/0213731 A1 | 9/2005 | Rodman et al. | |
| 2005/0271194 A1 | 12/2005 | Woods et al. | |

FOREIGN PATENT DOCUMENTS

| | | |
|---|---|---|
| EP | 00659006 | 11/1994 |
| EP | 00762717 | 7/1996 |
| JP | 02123886 | 11/1990 |
| WO | 0019693 | 4/2000 |
| WO | 00072560 | 11/2000 |
| WO | 03081892 | 10/2003 |
| WO | 04010414 | 1/2004 |

OTHER PUBLICATIONS

*Audio Processes for Detection and Tracking*, Vaufreydaz et al., http://www.inria.fr/rapportsactivite/RA2004/prima2004/uid60.html, viewed on Jan. 24, 2006, 3 pages.
*Audio-Video Array Source Separation for Perceptual User Interfaces*, Wilson et al., MIT Articifical Intelligence Lab, 2001, 7 pages.
*Personal Multimedia-Multipoint Teleconference System*, Tanigawa et al., NTT Laboratories, 1991, 8 pages.

* cited by examiner

*Primary Examiner*—Suhan Ni
*Assistant Examiner*—Maria El-Zoobi
(74) *Attorney, Agent, or Firm*—Sheridan Ross P.C.

(57) ABSTRACT

The present invention is directed toward conference calls and methods, devices, and systems for facilitating a conference call. Specifically, the present invention allows participants of a conference call to selectively alter or mute other participants' voices in a conference call. More specifically, a number of participants may be associated with a single communication device and only a subset of those participants may have their voice signal altered or muted during the conference call.

29 Claims, 5 Drawing Sheets

| Participant | Phase Difference | Adjustment Parameters |
|---|---|---|
| Participant #1 | 0 -40° | None |
| Participant #2 | 40 - 100° | Decrease Volume |
| ⋮ | | |
| Participant #N | 310 - 360° | Mute |

SELECTIVE MUTING FOR CONFERENCE CALL PARTICIPANTS

FIELD

The invention relates generally to communication systems and conference calls between multiple participants, where more than one participant is using a single communication endpoint.

BACKGROUND

Conference and multi-person calling have become increasingly popular and common calling techniques for businesses as well as individual subscribers. These multi-line calling techniques allow multiple callers to be connected thereby allowing the callers to communicate with each other. The user may couple two or more telephone lines such that the user and the parties associated with the respective telephone lines may communicate with each other in a conference call. Alternatively, the user may place multiple calls and communicate with each of the called parties without allowing the called parties to communicate with each other.

Many conferencing systems employ a dedicated line for each participant in the conference call. The reason typical conferencing systems require participants to use their own communication device is because signal processing is thus made a much easier task and additional features can be provided to the customer. For example, if a single participant is using a dedicated communication device and subsequently is communicating with the other participants via a dedicated line, that single participant's voice can be easily separated from the other participants' voices and can be altered in a relatively easy fashion. In other words, when each participant is using a dedicated hard line, there exist many methods that allow one participant to alter another participant's voice. Participants can cut out audio or otherwise alter another participant's participation if they do not wish to speak with him/her. Participants may also mute their own dedicated communication device if they wish to talk to someone else and have a side conversation without transmitting their audio to everyone.

One drawback to such a configuration is that each participant is limited to using their own communication device when conferencing with the other participants. When many participants from the same office are on the same conference, it can be a nuisance to require each participant to have their own communication device. It is often desirable for the participants who work in the same office to all gather in a common area, i.e., a conference/meeting room, to participate in the conference call together. Having several participants in the same room may help to improve the conference experience because these participants can actually see and interact with one another in a natural setting. Unfortunately, when several participants are in the same room there may not be enough communication devices for each participant to control their own audio. One conference room may be equipped with three communication devices, and this will suffice as long as no more than three participants wish to engage in the conference call in the same room. As long as each participant is able to have their own communication device, known methods can be employed to enhance the conference experience for each participant.

However, if there are four participants that wish to take part in the conference in the same room and there are only three communication devices, the participants quickly become frustrated. At least two of the participants will need to share a single communication device or another communication device will need to be tracked down and brought into the conference room. If two of the participants attempt to share the same communication device, it becomes very difficult for other participants to mute and/or alter the voice signal from one of the two participants. Other participants may wish to only listen to what the first sharing participant has to say and may wish to mute the second sharing participant. To do this, the listening participant must toggle between muting and not muting of the shared communication device as the sharing participants take turns speaking.

Another problem that arises when participants attempt to share a communication device during a conference is that if one participant wishes to have a side conversation with another participant then the shared communication device needs to be muted. This may be acceptable in the event that only two participants are sharing a communication device, but if ten people are sharing the communication device, then all ten people must be muted if two of the participants wish to have a side conversation. The advantage of having multiple participants share a communication device is that there is no need to supply quantities of telephone equipment in proportion to the number of attendees. If more participants wish to engage in the conversation, no additional communication devices need to be employed. However, as participants begin to share a communication device, the advantages offered by using a single communication device, i.e., processing capabilities and additional features, become more difficult to implement.

Therefore, it would be desirable to have a communication device that provides the scalability of a shared communication device while also providing enhanced communication features offered by multiple dedicated communication devices.

SUMMARY

Embodiments of the present invention are directed generally to device, system, and method for allowing participants in a conference call to selectively mute themselves and/or other conference call participants. Specifically, a number of participants may be associated with the same communication device and only a subset of those participants may be muted or have their voice signals altered in some other fashion In one embodiment, the present invention is directed to a method of facilitating a conference call. The method includes the steps of:

receiving a sound signal at a microphone;

determining a relative spatial location of a source of the received sound signal;

based on the determined location of the source of the received sound signal, processing the received sound signal by performing at least one of the following steps:

(i) selectively altering the received sound signal in a first manner in the event that the received sound signal is received from a first determined location; and (ii) selectively altering the received sound signal in a second manner in the event that the received sound signal is received from a second determined location, wherein the first and second manners are different.

A spatial location of a source of the received sound signal is typically determined by implementing a microphone array that is operable to receive the same spoken signal at different times. For audio localization in three dimensions of space, the microphone array should comprise three sets of microphones (i.e., four microphones). Relative phase information is used to recognize the source position for speech signals. The delay between signals received at each microphone pair can be determined using an inter-correlation function between signal energy. The maximum of the inter-correlation function provides a time difference of arrival for each microphone pair. Then one of a number of methods may be employed to estimate the position of an acoustic source. One such method utilizes an analytic approach. Given the relative position of microphones in the microphone array, each possible time delay corresponds to a sphere of positions whose distance corresponds to the distance that sound travels during the delay. The time difference of arrivals of two microphones corresponds to a hyperbolic function that is the intersection of two spheres. Given three microphone pairs, one can compute the intersection of these hyperbolic functions to substantially predict the position of the acoustic source.

As used herein a "spatial origin" or "spatial location" may be defined as a physical location, either in space, or compared to a particular reference point and/or as a corresponding measured parameter (e.g., phase difference, time difference of arrival, amplitude difference, spectral characteristic differences, etc.) that can be correlated to a physical location. The spatial locations of the source of a signal may be represented in Cartesian coordinates, polar coordinates, or any other location scheme known in the art. Furthermore, a spatial location does not necessarily need to describe a single point in space. Rather, a spatial origin may correspond to a range of spatial positions.

Likewise a "set of spatial locations" corresponds to a collection of one or more spatial locations. A set of spatial locations may define a single point in space, a line, an area, and/or a volume of space. Specifically, a set of spatial locations can define a position or positions in one, two, or three dimensions having determined axial extents. Moreover, a set of spatial locations may correspond to a range of time/phase/amplitude differences associated with a range of spatial locations In accordance with at least some embodiments of the present invention, a signal received from a first participant may be separated from a signal received from a second participant that is using the same communication device as the first participant. The signal received from the first participant may be selectively altered independently of a signal received from the second participant. In other words, the signal from the first participant may be muted, if such an action is desired, whereas a signal received from the second participant may not be adjusted at all. Furthermore, even if the signals from the first and second participant are received at substantially the same time at the microphone array, each signal may be separated and independently processed.

This affords multiple participants to share a single communication device during a conference call. Furthermore, more participants can be dynamically added to the conference call without requiring additional communication devices to support the new participants. Additionally, processing capabilities are not sacrificed when a communication device is shared, unlike when a communication device was shared in the prior art.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having a conference bridge or other similar conferencing hardware, the invention is not limited for use with any particular type of communication system or configuration of system elements. Those skilled in the art will recognize that the disclosed techniques may be used in any communication application in which it is desirable to share a communication device during a conference call.

As used herein a "conference call" is a communication between three or more individuals, at least two of whom are sharing a communication device to communicate with at least one other participant.

Figure 1:
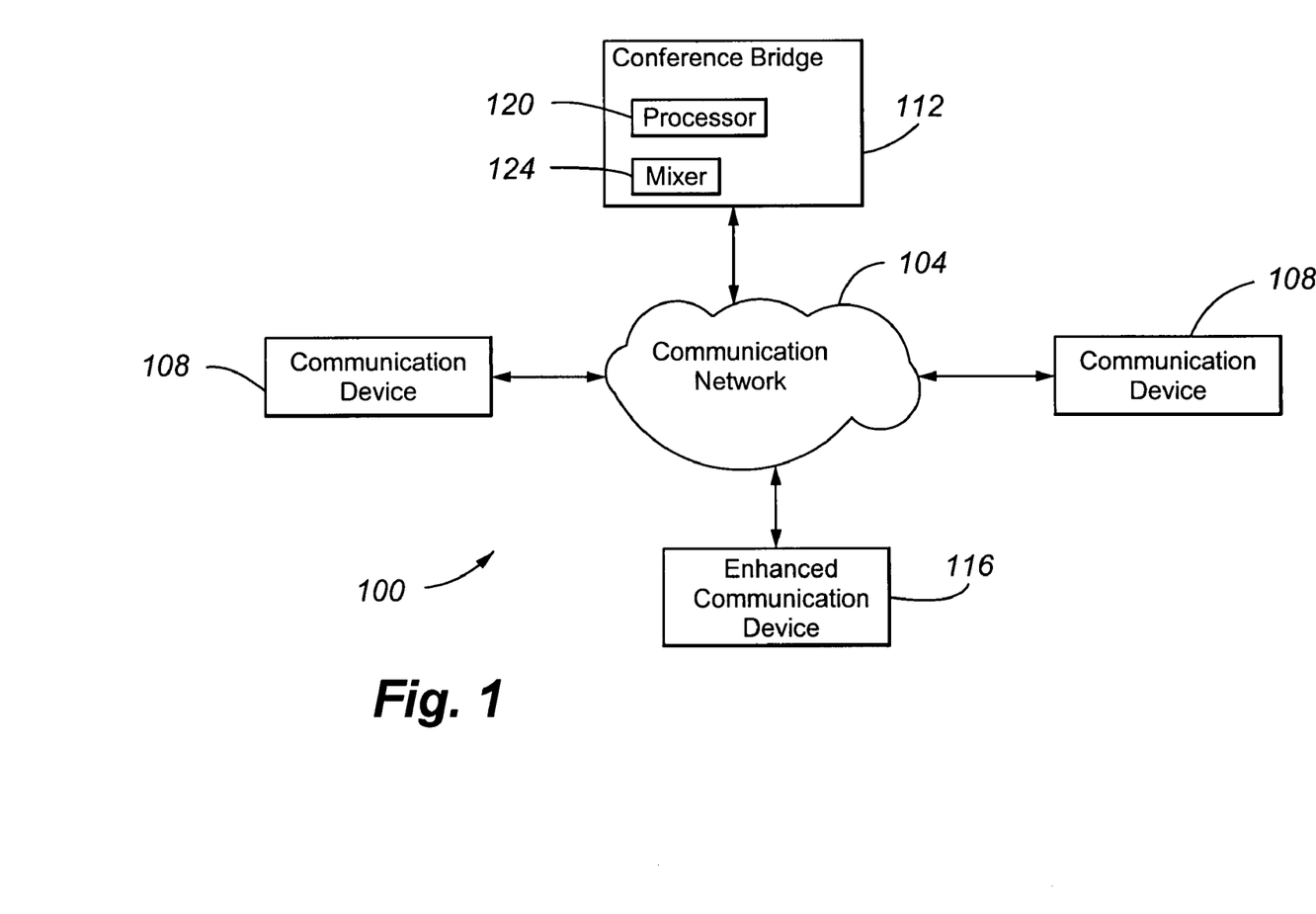
FIG. 1 depicts a communication system for facilitating a conference in accordance with at least some embodiments of the present invention.

Referring initially to FIG. 1, an exemplary communication system 100 will be described in accordance with embodiments of the present invention. The communication system 100 generally comprises a communications network 104 (e.g., a packet switched network and/or a circuit switched network), a plurality of telecommunication devices 108, a conference bridge 112, and an enhanced communication device 116.

The communications network 104 can be any data and/or distributed processing network, such as a PSTN, the Internet, or an enterprise network. The network 104 typically includes proxies, registrars, and routers for managing packet flows in the case of a packet-switched network.

The communication devices 108 and/or 116 may be packet-switched and can include, for example, IP hardphones such as Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and Interactive Voice Response (IVRs), and packet-based traditional computer telephony adjuncts.

The communication devices 108 and/or 116 may also be circuit-switched in the event that a circuit-switched network is utilized. Circuit-switched communication devices 108 can include, for example, wired and wireless telephones, PDAs, H.320 videophones and conferencing units, voice messaging and response units, and traditional computer telephony adjuncts.

The conference bridge 112 comprises a processor 120 and a mixer 124. The processor 120 is operable to perform various signal processing functions on any incoming signal. For example, if a first participant wishes to mute a second participant during a conference, then the first participant may send a command to the processor 120 requesting such service. The processor 120 will then mute or otherwise remove the second participant's voice signal before it is transmitted to the first participant. The processor 120 may also be able to adjust each participant's voice signal such that a normalized signal is transmitted to every other participant. In other words, the processor 120 may decrease the volume of participants who are speaking loudly and may increase the volume of participants who are speaking quietly such that the volume of every participant's voice signal is approximately the same. Similarly, the processor 120 may compensate for a communication system that attenuates or amplifies a participants voice by processing each participant's voice individually. The processor 120 is also operable to perform any other predetermined functions within a memory of the conference bridge 112.

Users of the external and internal endpoints may wish to communicate with one another across the communication network 104. In the event that a simple point-to-point connection is desired, the two subject endpoints are directly connected by hardware within the communications network 104 and a single communication path is established. However, when several users of the external endpoints wish to conference with each other simultaneously, the conference bridge 112 is typically employed. The conference bridge 112 connects each channel from each endpoint participating in the conference call such that every participant of the conference call can hear what any one of the other participants is saying at a given time. This is accomplished by a number of mechanisms. One such mechanism is the received signals from every endpoint are summed together by the mixer 124 into a single outgoing signal for each participant. Each participant's received signal is generally not added to (or subtracted from) the summed signal from the summed signal that a given participant will receive. Specifically, if three parties A, B, and C are joined in a conference call, the signals from parties A and B are summed and sent to party C, the signals from parties A and C are summed and sent to party B, and the signals from parties B and C are summed and sent to party A. This is typically accomplished by having each channel of the conference bridge 112 have its own mixer 124.

Traditional mixing of user inputs may be utilized as noted above or more sophisticated methods of mixing, for example "edgepoint" mixing may be employed. A description of edge point mixing can be found in PCT Patent Application No. 00/72,560 to Truechat, Inc., the contents of which are herein incorporated by this reference. In the '560 application, each communication device is equipped with a mixer that allows for mixing of other participant's voice signals at the communication device (edge), rather than at a central conference bridge.

It should be emphasized that the configuration of the conference bridge, communication device, and other elements as shown in FIG. 1 is for purposes of illustration only and should not be construed as limiting the invention to any particular arrangement of elements. For example, the conference bridge 112 logic may be included in a switch/server or be configured as an adjunct to a switch/server.

Figure 2:
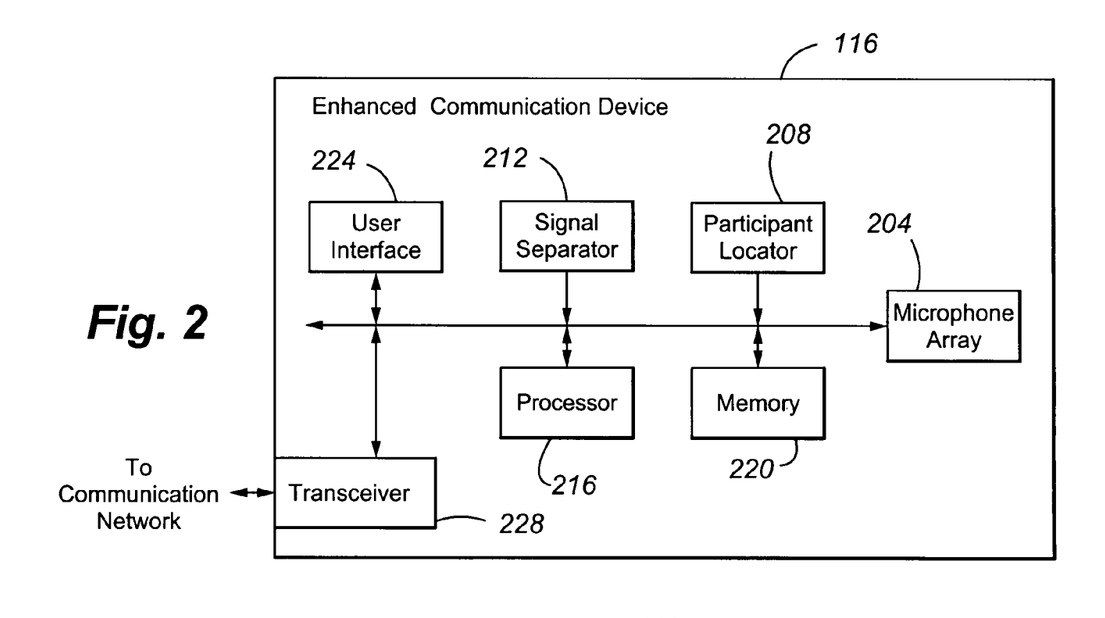
FIG. 2 depicts an enhanced communication device in accordance with at least some embodiments of the present invention.

Referring now to FIG. 2 an enhanced communication device 116 will be described in accordance with at least some embodiments of the present invention. The enhanced communication device 116 comprises a microphone array 204, a participant locator 208, a signal separator 212, a processor 216, a memory 220, a user interface 224, and a transceiver 228. The enhanced communication device 116 is generally configured and meant for use by more than one participant at a time. Of course a single participant may utilize the enhanced communication device 116, but certain inventive aspects may not be completely realized.

The microphone array 204 is typically a set of two or more microphones. As can be appreciated, however, other types of voice-to-electronic signal transducers may be utilized. The microphones in the microphone array 204 are generally spaced apart such that a single voice signal is received by one microphone at a different time than the signal is received at a second microphone. The result is a phase difference between the signal received by the first microphone and the signal received by the second microphone. The phase difference in received signals may be used to determine where a participant is in relation to the microphone array 204. In other words, the phase difference may be able to help identify the location where a particular voice signal originated.

The'microphone array 204 may also comprise one or more speakers that are able to transform received electrical voice signals from the transceiver 228 into sound signals that can be heard or otherwise perceived by the participant(s) using the enhanced communication device 116.

The participant locator 208 is operable not only to measure the phase difference between the signal received at the first microphone and the signal received at the second microphone, but also to correlate the phase difference to a location of a particular participant. The participant locator essentially can spatially identify a participant of a conference call by simply measuring the phase difference of a signal received by the microphone array 204.

The signal separator 212 is operable to take the identification from the participant locator 208 and assign the voice signal to a virtual channel. A virtual channel is embodied not as a physically separate channel dedicated to a particular participant. Rather, a virtual channel is the association of a set of measured parameters to a participant. The set of measured parameters may include phase shift as noted above and/or an amplitude difference of a received signal as measured by the microphone array 204. Additionally, the set of measured parameters may further include measuring spectral characteristics (i.e., frequency, pitch, tone, etc.) to identify participants as they move about the microphone array 204. The association for a received signal is maintained such that the received signal may be processed independently of any other received signal that is associated with another different set of measured parameters. For example, a first virtual channel may correspond to a phase difference between about 30 and 90 degrees. Any signal that is received and has a measured phase difference between about 30 and 90 degrees is assigned to the first virtual channel and processed according to individual adjustment parameters of the first virtual channel. A second virtual channel may correspond to a phase difference between about 90 and 150 degrees. Any signal that is received and has a measured phase difference between about 90 and 150 degrees is assigned to the second virtual channel and processed according to the adjustment parameters of the second virtual channel. Multiple virtual channels (e.g., up to N virtual channels, wherein N is typically greater than or equal to 1) may exist within a single communication channel but each may be processed differently according to the associated measured parameter of the received signal. Thus, the signal separator 212 does not typically physically separate received signals into different communication channels. Instead, the signal separator 212 creates an association between a received signal and its set of measured parameters. Of course, embodiments can be envisioned where the signal separator 212 separates each received signal according to the corresponding set of measured parameters and subsequently assigns the received signal to an actual communication channel that is dedicated to a single participant. This way any signal received at the microphone array 204 would be separated into a dependent communication channel after the origin of the signal has been identified by its measured parameters.

The processor 216, using routines stored in the memory 220, operates, at least in part, to alter signals received from the microphone array 204. Specifically, the processor 216 is operable to independently process each virtual channel. For instance, assuming there are four participants sharing the enhanced communication device 216, and each participant has been assigned to a different virtual channel, then the enhanced communication device 216 is operable to adjust properties of a signal in the first virtual channel without adjusting any properties of a signal in the second virtual channel. Likewise, the third and fourth virtual channels may be processed independently as well.

The processor 216 identifies the virtual channel for a received signal by referencing the set of measured parameters that have been linked to the received signal. Then based on the identified virtual channel, the processor 216 can alter the signal if such an action is desired. Examples of suitable alterations that can be performed on a received signal include, but are not limited to, muting the signal, increasing the volume of the signal, decreasing the volume of the signal, and so on. The processor 216 is not necessarily required to alter a particular signal and therefore, the selective alteration of a received signal is achieved.

The processor 216 may be suitable type of microprocessor, a Reduced Instruction Set Computer (RISC), a Complex Instruction Set Computer (CISC), an Application Specific Integrated Circuit (ASIC), or other type of processing equipment. Furthermore, functions performed by the participant locator 208 and signal separator 212 may be performed completely or in part by the processor 216.

The memory 220 includes logical instructions for the participant locator 208, signal separator 212, and/or processor 216 to perform as well as memory storage buffers. The memory 220 may be any type of memory including Random Access Memory (RAM), Read Only Memory (ROM), Dynamic RAM (DRAM), Flash Memory, Electronically Programmable ROM (EPROM), and the like.

As will be appreciated, one or more of the components of the enhanced communication device 116, such as the participant locator 208, the signal separator 212, and the processor 216, may be included in the conference bridge 112 or a switch/server rather than in the communication device 116. The processing steps may be completely performed at an enhanced communication device 116 separate from the connection point (e.g., the server/switch or the conference bridge 112). Alternatively, certain processing steps may be performed separately but managed locally or all processing steps may be performed and managed locally at a server/switch or conference bridge 112. For example, the enhanced communication device 116 may separate voice signals into virtual lines, and assign each virtual line to an actual line before it is forwarded on to the conference bridge 112. The conference bridge 112 may adjust parameters of signals received on each line independently then forward the adjusted signals on to the receiving endpoint. If the virtual channels are distributed at the enhanced communication device 116, then the conference bridge 112 can rely on typical processing functions in the processor 120. Alternatively, a composite received signal can be transmitted from the enhanced communication device 116 to the conference bridge 112 where different signals from different participants are split into virtual lines and then processed prior to transmission to another communication device 116.

The user interface 224 may include a touchtone keypad or some other type of user input for dialing numbers to call. The user interface 224 may also comprise a visual display as an output device that shows a one or more of the sharing participants where it believes the participants are located relative to the enhanced communication device 116. The display portion of the user interface may be in the form of a Liquid Crystal Display (LCD) screen, a set of Light Emitting Diodes (LEDs), a single LED, a clock face with arrows, a Cathode Ray Tube (CRT) display, or other type of mechanism able to articulate information to participants using the enhanced communication device 116.

The transceiver 228 is operable to receive signals from the communication network 104 for transmission to the participants using the enhanced communication device 116. The transceiver 228 is also operable to transmit signals, either over a single communication channel, virtual channels, or via separate dedicated channels. Examples of suitable transceivers include an Ethernet port or other type of network adapter, a modem, or a plain old telephone line.

Figure 3A:
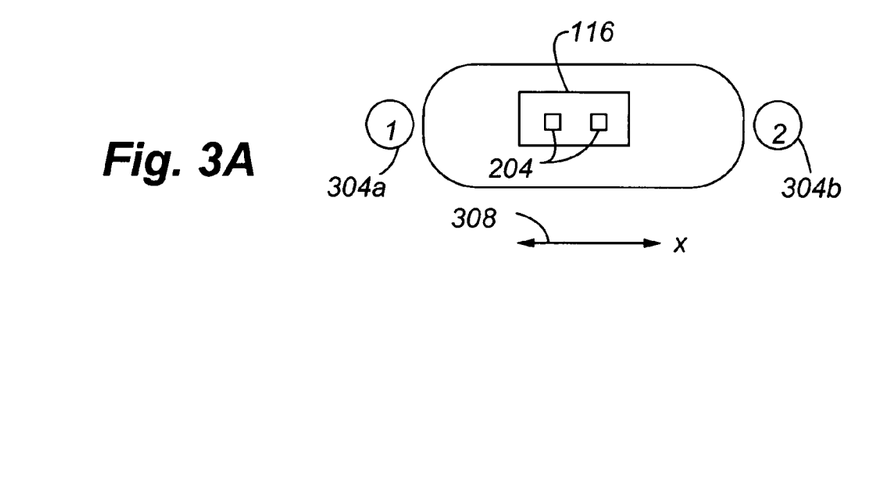
FIG. 3A depicts a one-dimensional microphone array for use in an exemplary communication device in accordance with at least some embodiments of the present invention.

With reference to FIG. 3A an enhanced communication device 116 equipped for distinguishing the location of participants will be described in accordance with at least some embodiments of the present invention. The enhanced communication device 116 depicted in FIG. 3A comprises a microphone array 204 which subsequently encompasses two microphones. A first participant 304a is located in a first position relative to the microphone array 204. A second participant 304b is located in a second position relative to the microphone array 204. These participants lie in different spatial positions along a single axis (i.e., the x-axis 308). Although the participants are depicted as sitting diametrically opposed to one another in relation to the microphone array 204, the microphone array 204 would function properly if each of the participants were sitting closer to one another, for instance on the top side of the table. As can be appreciated by one of skill in the art, additional participants may share the enhanced communication device 116 and may be positioned at any point on or around the table. The use of two microphones in the microphone array 204 allows the participant locator 208 to at least identify a location of participants along the x-axis 308.

In operation each microphone in the microphone array 204 receives a single voice signal from the first 304a and/or second 304b participant. When the first participant 304a speaks, the microphone closest to the first participant 304a (i.e., the left-most microphone) receives the voice signal first. The microphone that is further away from the first participant 304a (i.e., the right-most microphone) receives the voice signal at some time after the first microphone received the voice signal, due to the additional distance the signal must travel. The waveform of each received signal is essentially the same, assuming they are not spaced extremely far apart. However, the signal from the first microphone is offset in phase from the signal from the second microphone. The phase difference generally corresponds to a position somewhere along the x-axis 308. Assuming the center of the microphone array 204 (i.e., the midpoint between the two microphones) is the zero mark of the x-axis, the participant locator 208 correlates a signal received at the left-most microphone before it is received at the right-most microphone to have originated somewhere left of the microphone array 204. The greatest possible phase difference means that the speaking participant is located directly across the left microphone from the right microphone. In other words, the speaking participant is located on the x-axis formed by the two microphones. A lesser phase difference means that the speaking participant is located somewhere between the center of the microphone array 204 and the axis formed by the two microphones. In the event that no phase difference is measured between the signal received at the right and left microphones, then the participant locator 208 can determine that the speaking participant is located at the center point of the x-axis 308. The participant locator 208 is operable to determine that the speaking participant is located the same distance from the left microphone as he/she is from the right microphone. This location is only possible at the center of the x-axis 308.

One drawback to using a microphone array 204 equipped with only two microphones is that locations of speakers can only be determined along one axis. In other words, if two participants were seated directly across the table from each other and both were on the center point of the x-axis 308, then the participant locator 208 would likely confuse these participants because the phase difference for each participant would be substantially zero.

Figure 3B:
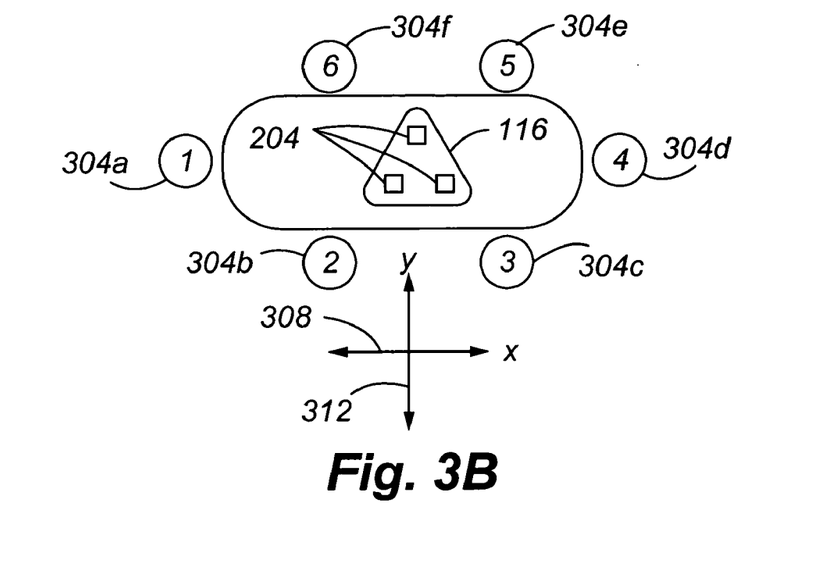
FIG. 3B depicts a two-dimensional microphone array for use in an exemplary communication device in accordance with at least some embodiments of the present invention.

To remedy this problem a microphone array 204 equipped with three microphones may be employed. With reference to FIG. 3B an enhanced communication device 116 equipped with a microphone array 204 having three microphones will be described in accordance with at least some embodiments of the present invention. A microphone array 204 equipped with three microphones is operable to identify the location of participants in two dimensions. Specifically, the location of a participant may be determined in both the x-axis 308 and y-axis 312. The x-axis 308 and y-axis 312 both lay a plane defined by the three microphones of the microphone array 204. Typically, the plane formed by the three microphones of the microphone array 204 is typically parallel to a floor, table, or some other common surface. However, the three microphones may be tilted relative to a common surface if doing so is found desirable. Any configuration of the microphones in the microphone array 204 may be suitable depending upon the application envisioned.

With three microphones participants may sit directly across from each other along one axis and the participant locator 208 can still discern between the participants based on their location along the other axis. As shown in FIG. 3B, the six participants 304a-f are sitting around a table or the like that is supporting the enhanced communication device 116. In the event that the first participant 304a is speaking, the left-most microphone will receive the voice signal before the center and right-most microphones. Also, the center microphone will receive the voice signal before the right-most microphone. The waveform received at each microphone will be substantially the same but each waveform will be offset by the other waveforms by some amount of phase shift. Based on the difference between phases of the signal received at the first, second, and third microphones, the participant locator 208 will be able to determine the location of the first participant 304a along the x-axis 308 and the y-axis 312. More interestingly, however, when three microphones are used the second participant 304b may be distinguished from the sixth participant 304f. When the second participant 304b speaks, a phase difference will exist between each of the signals received at each of the microphones. Specifically, a first difference will exist between the left-most and the right-most microphone, a second difference will exist between the left-most and the center microphone, and a third difference will exist between the right-most and the center microphone. When the sixth participant 304f speaks, the phase difference between the right-most and the left-most microphone will most likely be the same as the phase difference for the second participant 304b. However, the phase difference between the center microphone and the other microphones will differ from the phase differences measured for the second participant 304b. By using some or all of the phase differences the participant locator 208 will be operable to determine the respective location of each participant relative to the microphone array 204 and will therefore be able to assign each participant to a dedicated virtual channel.

Figure 3C:
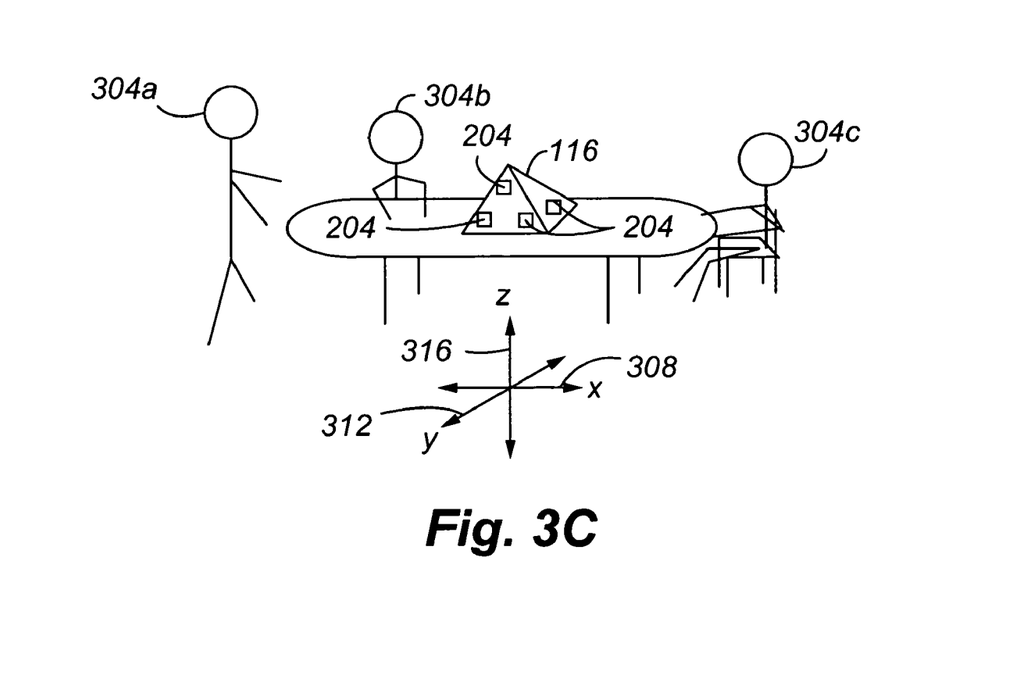
FIG. 3C depicts a three-dimensional microphone array for use in an exemplary communication device in accordance with at least some embodiments of the present invention.

With reference to FIG. 3C an enhanced communication device 116 equipped with a microphone array 204 having more than three microphones will be described in accordance with at least some embodiments of the present invention. Ultimately, the use of three microphones limits the determination of location to two dimensions in the plane of the three microphones. To determine the location of participants in three dimensions more than three microphones should be utilized and at least one of the three microphones should be out of a plane formed by the other three microphones. Using more than three microphones allows the participant locator 208 to determine the location of a participant in the x-axis 308, y-axis 312, and the z-axis 316. The depicted axes are arbitrary and any set of coordinates may be utilized in order to define the location of a particular participant. Specifically, polar coordinates like distance away from the microphone array 204 along with angle of the participant relative to the microphone array 204 may be used to define where a participant is located rather than the Cartesian coordinate system described herein.

When more than three microphones are used it may be possible to distinguish between participants that are standing up and other participants that are sitting down. Additionally, when more microphones are used it becomes possible to accurately identify the location of more participants because more phase differences can be measured and correlated to a particular participant. A further discussion of microphone arrays and their uses can be found in *Audio-Video Array Source Separation for Perceptual User Interfaces* by Wilson et al., the contents of which are herein incorporated by this reference.

Figure 4:
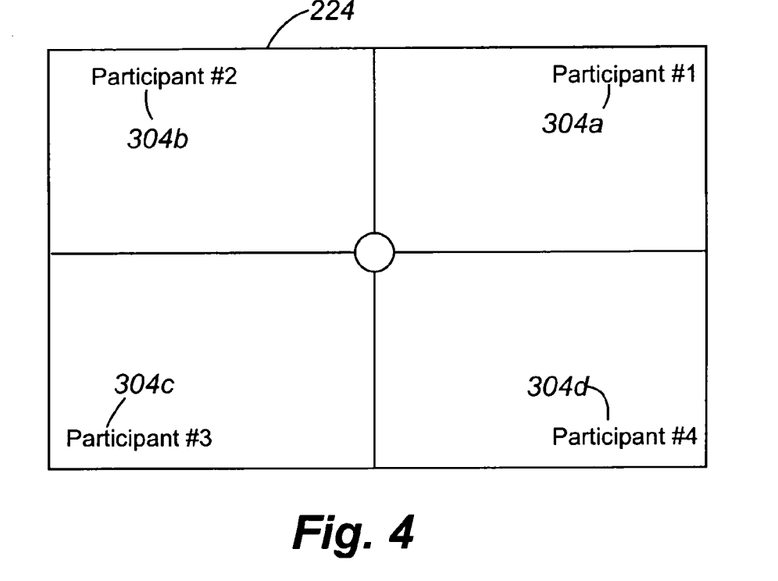
FIG. 4 depicts a spatial representation of participants in accordance with at least some embodiments of the present invention.

Referring now to FIG. 4 an exemplary user interface 224 will be described in accordance with at least some embodiments of the present invention. The user interface 224 may be operable to display where it believes the possible locations of a participant are related to the microphone array 204. For example, in the depicted embodiment, four participants are sharing an enhanced communication device 116. The participant locator 208 has determined the location of the participants to a certain degree of certainty and assigned a different quadrant of the room to each participant.

As used herein a "room" is any space that is around the enhanced communication device. The term room is not meant to limit embodiments of the present invention to spaces that are enclosed with walls or the like.

The quadrants assigned to each of the four participants 304a-d are not necessarily equal portions of the room. For example, the first participant 304a may be assigned to a first portion of the room that is between about 0 and 15 degrees as measured by the horizontal axis. The angle of about 0 to 15 degrees may correspond to a first amount of measured phase shift at the microphone array 204. The second participant 304b may be assigned to a second portion of the room that is between about 15 and 180 degrees. This particular participant may be assigned a larger portion of the space around the enhanced communication device 116. As can be appreciated by one of skill in the art, a portion and corresponding phase shift range that a participant is associated with should not overlap with another portion and corresponding phase shift range for another participant. In other words, each of the assigned phase shift ranges should be mutually exclusive for each participant. On the other hand, the phase shift ranges do not necessarily need to be collectively exhaustive of the possible ranges around the microphone array 204. However, in a preferred embodiment the participant locator 208 will assign a first participant to the entire room. Then when another participant is identified, the participant locator will divide the room evenly among the first and second participant. As additional participants continue to share the enhanced communication device 116, the participant locator will continue to sub-divide the space around the microphone array 208 accordingly.

The location of various participants and/or their designated portions may be displayed by an arrow pointing to the participant (i.e., the perceived origin of a voice signal), a pie chart depicting which portion or range of angles relative to the microphone array 204 each participant is associated with, an LED or LCD depicting the name of the identified participant based on his/her location, or some other type of display.

The user interface 224 may also comprise inputs that allow the sharing participants to mute either their own voice by touching the display showing their location. This way, in the event that three or more participants are sharing an enhanced communication device 116, two of those participants may mute their voice (i.e., associated portion/virtual channel) without muting all other participants. The two participants that mute their virtual channels will be able to have a side conversation without muting all other participants that are sharing the enhanced communication device 116. Alternatively, one participant can mute several participants including him/herself. Moreover, a portion of the room may be muted that does not necessarily correspond to a participant. For example, a projector with a noisy fan or an air-conditioning vent can be selectively muted such that it is not heard by the listening participant(s). Thus, the enhanced communication device 116 is dynamically scalable to provide more or less virtual channels as more or less participants wish to share the communication device 116.

The user interface 224 is further operable allow a participant to mute other individual participants in the conference call. For example, if a listener and speaker are equipped with an enhanced communication device 116, then the listening party may be displayed which participant is currently speaking and their associated virtual channel. The listening participant may be able to selectively mute the virtual channel associated with just one of the speaking participants sharing the other enhanced communication device 116. This way, the listening party can choose which participant he/she is listening to even though that participant may be sharing the enhanced communication device 116 with other participants that the listener would like to hear.

Figure 5:
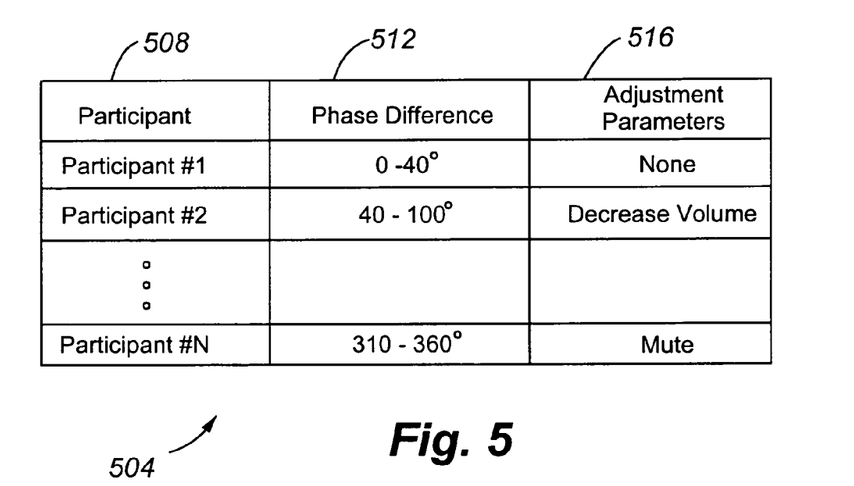
FIG. 5 is a block diagram depicting a data structure employed in accordance with at least some embodiments of the present invention.

Referring now to FIG. 5 a data structure 504 employed by at least some embodiments of the present invention will be described. The data structure 504 comprises a participant data field 508, a phase difference data field 512, and an adjustment parameter field 516. The data structure 504 may be stored in the memory 220 of the enhanced communication device 116, in a memory of the conference bridge 112, and/or in an external database. When a new participant is identified, for example, by the participant locator 208, voice recognition software, or by the participant pressing a button on the user interface 224 indicating that he/she would like to share the enhanced communication device 116, the participant is added to the participant data field 508. The data relating to a participant may simply be an arbitrary identification number assigned to each participant as they are added to the conference, such that the first participant that is identified is given the number one, the second participant is assigned the number two, and so on. Alternatively, the data may be more detailed identification information if such information is available for a participant. More detailed identification information may be entered by the participant into the enhanced communication device 116 prior to beginning a conference call or may be referenced from an external database used to store such information. If more detailed information is available for a participant, then that information can be forwarded to other participants of the conference call when a participant is speaking. This may allow the other listening participant to know whether or not they would like to mute the speaking participant.

The participant locator 208 dynamically populates the phase difference data field 512 as additional participants share the enhanced communication device 116 or as participants quit sharing the enhanced communication device 116. As a participant speaks the phase difference measured by the microphone array 204 is analyzed and the participant locator 208 determines the approximate location of the speaking participant relative to the microphone array 204. Thereafter, the participant locator 208 determines how many participants are already sharing the enhanced communication device 116. If no participants are currently sharing the enhanced communication device 116, then the first participant may be assigned all possible phase differences in the phase difference field 512 even though the participant locator 208 knows approximately the phase difference(s) for the first participant and thus where he/she is located. Alternatively, the exact phase difference measured at the microphone array 204 may be entered into the phase difference array 512.

When a second participant begins to share the enhanced communication device 116, the participant locator 208 is operable to analyze the phase difference of the voice signal received at the microphone array 204 to determine the approximate location of the second participant. Alternatively, the second participant may manipulate the user interface 224 such that the enhanced communication device 116 knows the approximate location of the second participant. Now that there are two participants sharing the enhanced communication device 116, the participant locator 208 may assign a first portion of the room to the first participant and a second portion of the room to the second participant. The size of each portion does not necessarily need to be equal in size. However, such an implementation would be an easy way to divide the room. The phase difference corresponding to each portion of the room is entered into the phase difference field 512 by the participant locator 208. The signal separator 212 uses the association of the phase difference to a participant when a received signal is assigned a virtual channel. If a received signal has a phase difference within the phase difference range for the first participant, then the signal separator 212 will assign the received signal to a first virtual channel. However, if the received signal has a phase difference within the phase difference range for the second participant, then the signal separator 212 will assign the received signal to a second virtual channel. As additional participants are added, the participant locator 208 will continue to re-divide the room and corresponding phase difference ranges among the sharing participants and the signal separator 212 will be able to assign each new participant to a new virtual channel accordingly.

Each of the virtual channels may have a different adjustment parameter associated with them. The information related to the adjustment parameters for a virtual channel is maintained in the adjustment parameters field 516. The sharing participants of the enhanced communication device 116 may define the adjustment parameters. For example, when a sharing participant wishes to mute or adjust his/her own voice. Alternatively, other participants across the communication network 104 may define adjustment parameters. For instance, voice signals may be transmitted across the communication network 104 with their associated phase difference, such that the receiving participant's communication device can substantially identify the speaking participant based on his/her phase difference. The receiving participant may choose to mute or alter a subset of the participants whom are sharing the enhanced communication device 116. As noted above, as long as an association between a measured phase (or amplitude) difference at the microphone array 204 and a participant is maintained, a signal may be assigned to a virtual channel and adjusted independently of other signals received at the same microphone array 204 having different measured differences. The originating enhanced communication device 116 associated with the speaking participant, the conference bridge 112, or the targeted enhanced communication device 116 associated with the listening participant may perform the adjustments that are defined in the adjustment parameters 516. Furthermore, any one of the above noted devices may define the adjustment parameters in the adjustment parameter field 516 for another device to perform. For example, the listening participant may define that he/she would like to have the one of the sharing participant's voice turned up. The originating enhanced communication device may increase the volume for that particular participant's virtual channel prior to transmitting the voice signal to the listening participant.

Figure 6:
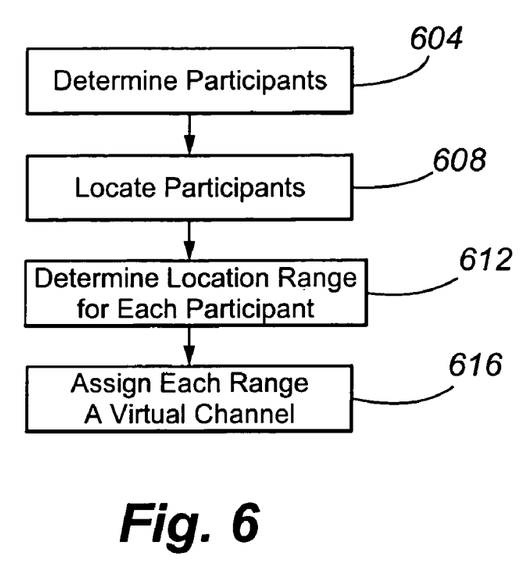
FIG. 6 is a flow chart depicting a method for initializing a conference call in accordance with at least some embodiments of the present invention.

Referring now to FIG. 6, a method of initializing a conference call will be described in accordance with at least some embodiments of the present invention. Initially, the conference call participants are determined (step 604). As noted above, each participant may be required to engage a button or the like on the user interface 224 indicating that he/she will be sharing the enhanced communication device 116. The enhanced communication device 116 can keep a tally of how many participants are sharing the device, thus allowing the participant locator to divide the room relatively accurately. Alternatively, a participant may be identified before conference call even begins. Further in the alternative, the participant locator 208 may simply monitor received voice signals and attempt to discern between different participants based on the origin of their voice.

After a participant has been determined, the participant locator 208 identifies a location for that participant (step 608). Typically, the location as identified by the participant locator 208 is a location relative to the microphone array 204. The location of the participant is then expanded by the participant locator 208, usually depending upon the number of sharing participants, to include a location range for each participant (step 612). The ranges assigned to each participant do not need to be the same size. The signal separator 212 then assigns each location range, i.e., phase difference range, to a particular virtual channel (step 616). This assignment is maintained through the duration of the conference call, unless the number of sharing participants changes, such that each participant can be uniquely identified by his/her location relative to the microphone array 204. As a result, the voice signal of each participant can be independently treated and adjusted.

In accordance with at least some embodiments of the present invention, the participant locator 208 is operable to identify when a participant has moved during a conference call. For example, assume that two participants are seated directly opposite one another in relation to the microphone array 204. With this particular orientation, the participant locator 208 can assign one half of the room to a first participant and the other half of the room to a second participant. Now assume that the second participant moves around the microphone array 204 closer to the first participant. When the second participant begins to speak, the participant locator 208 is operable to identify a new location for the participant and assign a portion of the room to the participant. The participant locator 208 may identify the participant based on voice qualities of the participant by analyzing spectral properties (i.e., frequency, pitch, etc.) of the participant's voice and can re-divide the room into two portions that correspond to the new locations of the first and second participant. Alternatively, the participant locator 208 may not attempt to identify the participant based on his/her speech qualities, but rather may simply assume the second participant is actually a new third participant. The participant locator 208, based on this assumption, may divide the room into three portions. The signal separator 212 may correspondingly assign a third virtual line to the assumed third participant (who is actually the second participant). As the conference continues, the participant locator 208 may monitor each portion of the room for voice activity. After a predetermined amount of time has passed, and the participant locator 208 has not detected any voice activity from the second participant's previous location, the participant locator 208 may determine that the second participant is no longer using his/her previous location and may re-divide the room into two portions corresponding to the new locations of the first and second participants. It may prove beneficial to continuously update the room division such that it accurately represents the number of active participants sharing the enhanced communication device 116.

Figure 7:
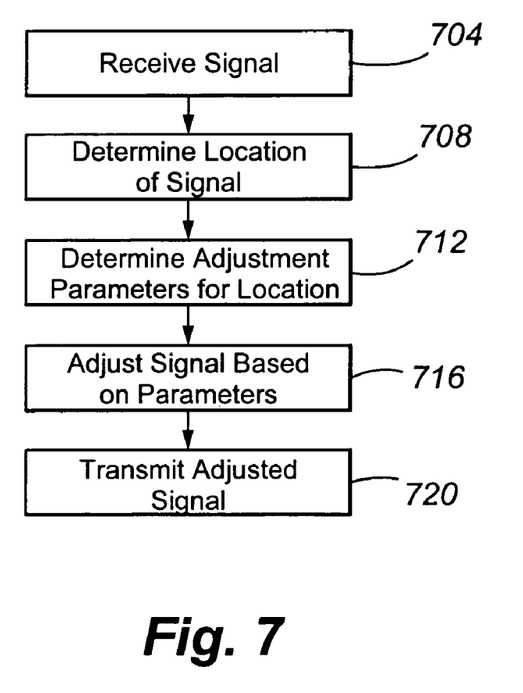
FIG. 7 is a flow chart depicting a method for facilitating a conference call in accordance with at least some embodiments of the present invention.

Referring now to FIG. 7 a method of processing a participant's voice signal will be described in accordance with at least some embodiments of the present invention. The method begins when a signal is received at the microphone array (step 204). This means that the received signal has been received at least two of the microphones in the microphone array 204. Thereafter, the location of the signal is determined (step 708). As noted above, the location, or location relative to the microphone array 204, may be determined by measuring the phase difference of the received signal at the microphone array 204. Alternatively or in combination, an amplitude difference between received signals may be measured to determine the location of a speaking participant. Based on the location, the signal separator 212 assigns the voice signal to a virtual channel and the adjustment parameters are determined for the given location (step 712). The types of adjustments that may be performed on a given signal include muting the signal, increasing the volume of the signal, decreasing the volume of the signal, altering the playback speed of the signal, and the like. After the adjustment parameters have been determined, the processor 216 adjusts the received signal based on its corresponding adjustment parameters. Another received signal from a different location may have a different set of corresponding adjustment parameters and therefore the adjustment parameters, if any, of each of the virtual channels may be substantially unique to that channel. More interestingly, however, each channel can be processed substantially independently of any other virtual channel because each channel has an associated location range. After the received signal has been properly adjusted, if such an action was necessary, then the adjusted signal is transmitted across the communication network 104 to the receiving communication device 108 and/or the communication bridge 112 (step 720). As noted above, the adjustment of a received signal does not necessarily need to be performed at the transmitting enhanced communication device 108. Rather, any suitable processor located within the communication system 100 may perform the adjustment.

In accordance with at least some embodiments of the present invention, the enhanced communication device 116 is operable to normalize the received signals of each of the sharing participants. Typically, when multiple participants share a communication device, some participants sit further away from the device than other participants. Therefore, even if each participant is speaking at the same decibel level, the receiving party perceives some participants to be speaking louder than other participants. However, because each virtual line associated with each participant can be processed independently, participants that are sharing the enhanced communication device 116 may appear to all be speaking at the same volume when the listener receives the signal from the enhanced communication device 116.

Furthermore, additional location technologies may be employed to augment audio location. For example, video monitoring may be utilized in order to assist the microphone array 204 in locating and tracking a particular participant during a conference. Suitable video monitoring techniques including mono and stereo video tracking may be used when the location of a source of sound is being determined. Additionally, the participant locator 208 may employ radio location (i.e., RFID tracking) to further increase the accuracy with which participants are tracked and located. For example, participants may be given RFID tags that can be located and tracked by an RFID scanner.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of facilitating a conference call, comprising:
   receiving, by a processor, a sound signal;
   determining, by the processor, a relative spatial location of a source of the received sound signal;
   based on the determined location of the source of the received sound signal processing the received sound signal by performing at least one of the following steps:
      selectively altering, by the processor, the received sound signal in a first manner in the event that the received sound signal is received from a first determined location;
      selectively altering, by the processor, the received sound signal in a second manner in the event that the received sound signal is received from a second determined location, wherein the first and second manners are different;
   creating, by the processor, a virtual channel for the received sound signal;
   creating, by the processor, sound parameters for the virtual channel;
   storing, by the processor, the selective alteration in the sound parameters; and
   transmitting, by the processor, the virtual channel with the stored sound parameters.

2. The method of claim 1, wherein the first and second sets of spatial locations are mutually exclusive.

3. The method of claim 1, further comprising assigning the received sound signal to one of at least two virtual channels, wherein a first virtual channel is associated with a first set of spatial locations, and wherein a second virtual channel is associated with a second set of spatial locations, wherein a received sound signal assigned to the first virtual channel is muted and a received sound signal assigned to the second virtual channel is not altered.

4. The method of claim 3, wherein a first participant is associated with the first virtual channel and wherein a second participant is associated with the second virtual channel.

5. The method of claim 4, further comprising:
   dividing a room into at least two portions;
   assigning the first participant to a first of the at least two portions;
   assigning the second participant to a second of the at least two portions; and wherein the first of the at least two portions is associated with the first virtual channel and the second of the at least two portions is associated with the second virtual channel.

6. The method of claim 5, further comprising:
monitoring the first and second portions for voice activity;
determining that voice activity has not occurred in at least one of the portions for a predetermined amount of time; and
removing the at least one portion of the room that has not had any determined voice activity for the predetermined amount of time.

7. The method of claim 1, further comprising:
providing a microphone array comprising at least two microphones;
receiving the sound signal at a first of the at least two microphones at a first time;
receiving the sound signal at a second of the at least two microphones at a second time;
determining a difference, if any, between the first and second time; and
wherein the spatial origin of the received sound signal is determined based at least in part on the difference between the first and second time.

8. The method of claim 1, further comprising:
associating the first determined location with a first phase delay range;
measuring a phase delay of the received sound signal;
determining whether the phase delay of the received sound signal lies between the first phase delay range; and
assigning the received sound signal to a first virtual channel in the event that the phase delay of the received sound signal lies within the first delay range.

9. The method of claim 1, wherein selectively altering comprises at least one of, muting, increasing the volume, and decreasing the volume of the received sound signal.

10. The method of claim 1, further comprising displaying first and second determined locations.

11. A computer readable medium comprising executable instructions operable to perform the method of claim 1.

12. A device for use in a conference call, wherein at least a first and second participant share a single communication device, comprising:
an input operable to receive a first sound signal from the first participant and a second sound signal from the second participant;
a participant locator operable to determine a spatial location of the first sharing participant;
a signal separator operable to, based on the determined spatial location of the first sharing participant, distinguish the sound signals received from the first sharing participant from the sound signals received from the second sharing participant;
a processor operable to:
process sound signals received from the first sharing participant independently of sound signals received from the second sharing participant;
create a first virtual channel for the first sound signal;
store the first sound signal and at least one parameter describing the first sound signal in the first virtual channel;
create a second virtual channel for the second sound signal; and
store the second sound signal and at least one parameter describing the second sound signal in the second virtual channel.

13. The device of claim 12, wherein the signal separator is further operable to assign the received sound signals to the virtual channels based on the determined spatial location of the sharing participants, wherein a first virtual channel is associated with a first spatial location, wherein a second virtual channel is associated with a second spatial location, and wherein the first and second sets of spatial locations are mutually exclusive.

14. The device of claim 12, wherein a received sound signal from the first participant is muted and a received sound signal from the second participant has a volume increased.

15. The device of claim 13, wherein the first participant is associated with the first virtual channel and wherein the second participant is associated with the second virtual channel the at least one parameter allows the sound signals to be adjusted.

16. The device of claim 12, wherein the participant locator is further operable to divide a room into at least two portions, assign the first sharing participant to a first of the at least two portions, assign the second sharing participant to a second of the at least two portions.

17. The device of claim 12, wherein the input comprises a microphone array comprising at least two microphones, wherein a first of the at least two microphones is operable to receive the sound signal at a first time, wherein a second of the at least two microphones is operable to receive the sound signal at a second time.

18. The device of claim 17, wherein the participant locator is further operable to determine a difference, if any, between the first and second time and substantially determine the spatial location of the origin of the received sound signal based at least in part on the difference between the first and second time.

19. The device of claim 12, wherein the participant locator is further operable to associate the first participant with a first phase delay range, measure a phase delay of the received sound signal, determine whether the phase delay of the received sound signal lies between the first phase delay range, and assign the received sound signal to the first virtual channel in the event that the phase delay of the received sound signal lies within the first delay range.

20. The device of claim 13, wherein the processor is operable to perform at least one of mute, increase the volume, and decrease the volume of the received sound signal in one of the at least two virtual channels without requiring the same change in another of the at least two virtual channels.

21. The device of claim 13, further comprising a user interface operable to display the spatial locations associated with the first and second virtual channel to the first and second sharing participant.

22. A method of facilitating a conference call, comprising:
receiving, by a processor, a sound signal;
determining, by the processor, a relative spatial location of a source of the received sound signal;
based on the determined location of the source of the received sound signal, assigning, by the processor, the received sound signal to one of at least two virtual channels, wherein a first virtual channel is associated with a first set of spatial locations, wherein a second virtual channel is associated with a second set of spatial locations storing, by the processor, a first set of parameters for the first set of spatial locations with the first virtual channel;
storing, by the processor, a second set of parameters for the second set of spatial locations with the second virtual channel; and processing, by the processor, the received sound signal by performing at least one of the following steps:

selectively muting the first virtual channel, increasing the volume of the first virtual channel by a first amount, and/or decreasing the volume of the first virtual channel by a first amount in the event that the received sound signal is assigned to the first virtual channel; and selectively muting the second virtual channel, increasing the volume of the second virtual channel, and/or decreasing the volume of the second virtual channel in the event that the received sound signal is assigned to the second virtual channel.

23. The method of claim 22, wherein the first and second sets of spatial locations are mutually exclusive.

24. The method of claim 22, wherein a received sound signal assigned to the first virtual channel is muted and a received sound signal assigned to the second virtual channel is not altered.

25. The method of claim 22, wherein a first participant is associated with the first virtual channel and wherein a second participant is associated with the second virtual channel.

26. The method of claim 25, further comprising:
dividing a room into at least two portions;
assigning the first participant to a first of the at least two portions;
assigning the second participant to a second of the at least two portions; and
wherein the first of the at least two portions is associated with the first virtual channel and the second of the at least two portions is associated with the second virtual channel.

27. The method of claim 22, further comprising:
providing a microphone array comprising at least two microphones;
receiving the sound signal at a first of the at least two microphones at a first time;
receiving the sound signal at a second of the at least two microphones at a second time;
determining a difference, if any, between the first and second time; and
wherein the spatial origin of the received sound signal is determined based at least in part on the difference between the first and second time.

28. The method of claim 22, further comprising:
associating the first virtual channel with a first phase delay range;
measuring a phase delay of the received sound signal;
determining whether the phase delay of the received sound signal lies between the first phase delay range; and
assigning the received sound signal to the first virtual channel in the event that the phase delay of the received sound signal lies within the first delay range.

29. A computer readable medium comprising executable instructions operable to perform the method of claim 22.

* * * * *